(12) United States Patent
Abell (10) Patent No.: US 9,596,935 B2
(45) Date of Patent: Mar. 21, 2017

(54) APPARATUSES AND METHODS FOR CONNECTING MODULAR OFFICE FURNITURE COMPONENTS

(71) Applicant: OFS Brands, Inc., Huntingburg, IN (US)

(72) Inventor: Chris Abell, Huntingburg, IN (US)

(73) Assignee: OFS Brands Inc., Huntingburg, IN (US)

( * ) Notice: Subject to any disclaimer, the term of this patent is extended or adjusted under 35 U.S.C. 154(b) by 0 days.

(21) Appl. No.: 14/829,121

(22) Filed: Aug. 18, 2015

(65) Prior Publication Data

US 2015/0366348 A1 Dec. 24, 2015

Related U.S. Application Data

(62) Division of application No. 13/169,458, filed on Jun. 27, 2011, now Pat. No. 9,144,310.

(Continued)

(51) Int. Cl.
*A47B 96/02* (2006.01)
*A47B 96/06* (2006.01)
*A47B 83/00* (2006.01)
*F16B 12/00* (2006.01)
*A47B 55/00* (2006.01)
(Continued)

(52) U.S. Cl.
CPC ............ *A47B 96/061* (2013.01); *A47B 55/00* (2013.01); *A47B 83/001* (2013.01); *A47B 96/06* (2013.01); *E04B 2/74* (2013.01); *F16B 12/00* (2013.01); *E04B 2002/7483* (2013.01);
(Continued)

(58) Field of Classification Search
CPC ..... A47B 96/061; A47B 55/00; A47B 96/021; A47B 96/06; A47B 96/063; A47B 96/065; A47B 96/066; A47B 96/068; A47B 96/00; E04B 2/74; E04B 2002/7483
USPC .. 248/250, 235, 245, 205.1, 231.85, 231.61, 248/230.5, 228.5, 229.24, 229.14
See application file for complete search history.

(56) References Cited

U.S. PATENT DOCUMENTS

| 437,935 A | * | 10/1890 | O'Brien ................... E04G 5/06 |
| | | | 182/186.6 |
| 1,324,246 A | * | 12/1919 | Furman ................ A47B 57/565 |
| | | | 248/245 |

(Continued)

*Primary Examiner* — Nkeisha Smith
(74) *Attorney, Agent, or Firm* — Bingham Greenebaum Doll LLP; James C. Eaves, Jr.; Brian W. Chellgren (57) ABSTRACT

Apparatuses and methods for connecting office furniture components are disclosed. One embodiment includes a two-piece bracket that attaches a vertical panel adjacent to and extending upward from the top of a second vertical panel, the bracket forming two channels having openings in opposite directions. Another embodiment includes a two-piece bracket that holds two vertical wall panels together, the bracket including a U-shaped member and an L-shaped member connected to one another to form an S-shaped member. Another embodiment includes a two-piece bracket that receives the edge of a panel in a channel between the two pieces and includes a contact surface between the two pieces that is angled to increase the pressure exerted on the panel. Still another embodiment includes a two-piece bracket that holds a shelf atop a wall panel and includes an L-shaped member and a T-shaped member that connect to form a Π-shaped member.

12 Claims, 7 Drawing Sheets

Related U.S. Application Data (60) Provisional application No. 61/359,635, filed on Jun. 29, 2010.

(51) Int. Cl.
 *E04B 2/74* (2006.01)
 *E05C 19/18* (2006.01)

(52) U.S. Cl.
 CPC ....... *E05C 19/182* (2013.01); *Y10T 29/49947* (2015.01); *Y10T 403/70* (2015.01)

(56) References Cited

U.S. PATENT DOCUMENTS

| | | | | | |
|---|---|---|---|---|---|
| 2,195,893 | A | * | 4/1940 | McGann | A47H 27/00 248/117.7 |
| 2,340,487 | A | * | 2/1944 | Paquette | B63C 5/02 182/82 |
| 3,080,980 | A | * | 3/1963 | Gibbons | A47B 57/30 108/152 |
| 3,469,810 | A | * | 9/1969 | Dorris | F16B 2/12 24/525 |
| 3,938,839 | A | * | 2/1976 | Collier | E05B 65/0894 292/258 |
| 3,993,279 | A | * | 11/1976 | Holt | E04G 17/18 248/228.1 |
| 4,078,835 | A | * | 3/1978 | Spencer | E05C 19/18 292/206 |
| 4,519,512 | A | * | 5/1985 | Frazier | A47B 57/565 211/193 |
| 5,228,667 | A | * | 7/1993 | Bridegum | E04G 21/16 269/45 |
| 5,645,257 | A | * | 7/1997 | Ward | A47B 57/565 108/108 |
| 5,651,522 | A | * | 7/1997 | Davis | B60H 3/0007 248/221.11 |
| 6,082,240 | A | * | 7/2000 | Middione | F41H 5/013 296/187.07 |
| 6,142,438 | A | * | 11/2000 | Cooper | E04F 10/0662 160/65 |
| 7,386,922 | B1 | * | 6/2008 | Taylor | E04D 13/10 24/525 |
| 7,896,302 | B2 | * | 3/2011 | Parker | F16L 3/1033 248/226.11 |
| 2005/0017142 | A1 | * | 1/2005 | Ogden | E04G 11/365 248/247 |
| 2011/0278428 | A1 | * | 11/2011 | Raye | F16B 2/02 248/674 |
| 2012/0175322 | A1 | * | 7/2012 | Park | F24J 2/5232 211/41.1 |
| 2012/0285103 | A1 | * | 11/2012 | Canavarro | E04B 2/7416 52/27 |

* cited by examiner

APPARATUSES AND METHODS FOR CONNECTING MODULAR OFFICE FURNITURE COMPONENTS

REFERENCE TO RELATED APPLICATION

This application is a divisional of U.S. patent application Ser. No. 13/169,458, filed Jun. 27, 2011, which claims the benefit of U.S. Provisional Application No. 61/359,635, filed Jun. 29, 2010, both of which are hereby incorporated herein by reference in their entireties.

FIELD

The present invention relates to furniture systems. More specifically, the present invention relates to office furniture systems using modular components.

BACKGROUND

Modular office furniture systems are frequently used in office buildings. These modular furniture systems provide the user with the ability to configure the office furniture in a number of potential configurations, thereby allowing each user some level of customization to adapt the furniture to the user's needs. For example, one user may configure a system to include workstations with short walls between each workstation, while another user may provide more privacy between the workstations by using brackets to attach privacy panels to the tops of the short wall panels and extend the height of the short wall panels separating the workstations. As another example, some users may set up workstations with access areas (similar to service windows where personnel can approach the workstation to conduct business) defined by a shelf held atop a short wall panel by a bracket.

SUMMARY

It was realized by the inventors of the current invention that problems exist with current modular office furniture systems and that improvements in these systems are needed. For example, it was realized that brackets used with current modular office furniture systems can be difficult to use, can present an unfinished appearance, and can damage or permanently mark components of the office furniture, and that improvements in these modular systems were needed.

Embodiments of the present invention provide improved apparatuses and methods for connecting modular office furniture components.

In accordance with one aspect of embodiments of the present invention, a two-piece bracket that is easy to use, presents a finished appearance, and securely supports a shelf on top of a vertical wall panel without damaging or permanently marking the vertical wall panel is provided. In certain embodiments, the bracket includes an L-shaped member and a T-shaped member than connect to form a Π-shaped bracket, with the shelf connecting to the top of the Π-shaped bracket and the vertical wall panel being snugly received within the channel formed between the two legs of the Π. Alternatively, at least one of the surfaces where the L-shaped and T-shaped members meet is angled to enhance the ability of the bracket to clamp to the vertical wall panel and hold the shelf steady.

In accordance with another aspect of embodiments of the present invention, a two-piece bracket is provided that holds a panel vertically, adjacent to and extending upward from the top portion of another vertical panel without damaging or permanently marking either panel. In certain embodiments, the bracket includes a U-shaped member and an L-shaped member that connect to form an S-shaped bracket with two channels, each channel snugly receiving a wall panel. Hardware that fastens the two members together is hidden once the bracket is installed, and one side of the U-shaped member is alternatively shorter than the other to facilitate easy installation and removal. Alternatively, at least one of the surfaces where the U-shaped and L-shaped members meet is angled to enhance the ability of the bracket to clamp to at least one of the vertical wall panels to hold it steady.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein.

DETAILED DESCRIPTION OF THE ILLUSTRATED EMBODIMENTS

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Figure 1:
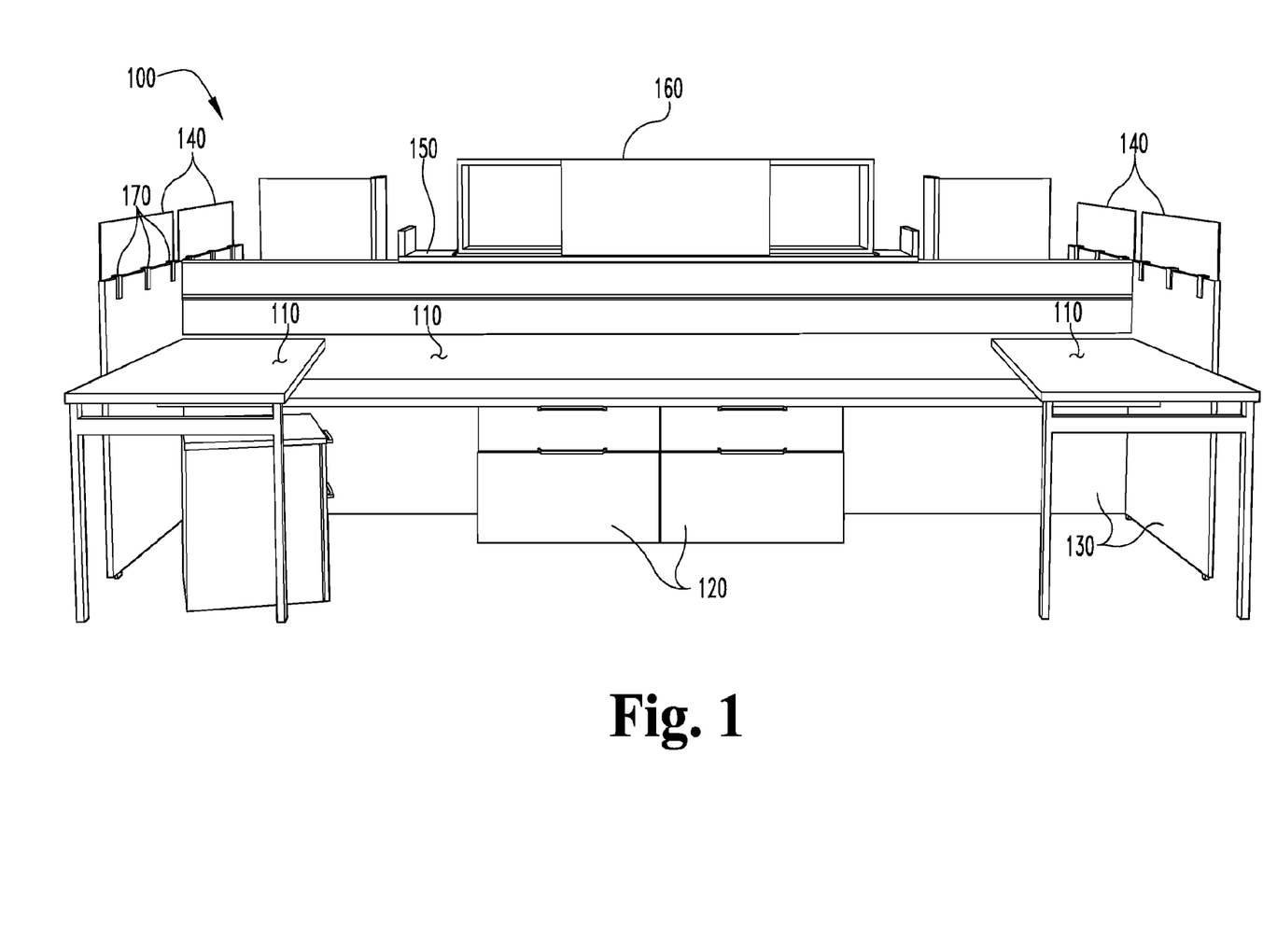
FIG. 1 is a perspective view of one embodiment of a modular office furniture system embodying the technology described herein.

Generally, one form of the present system is a modular office furniture system that uses novel, non-destructive connections between components. FIG. 1, for example, illustrates assembled furniture system 100, which includes desk surfaces 110, file drawers 120, vertical panels 130, privacy panels 140, shelves 150, storage cabinets 160, and panel brackets 170.

Figure 2:
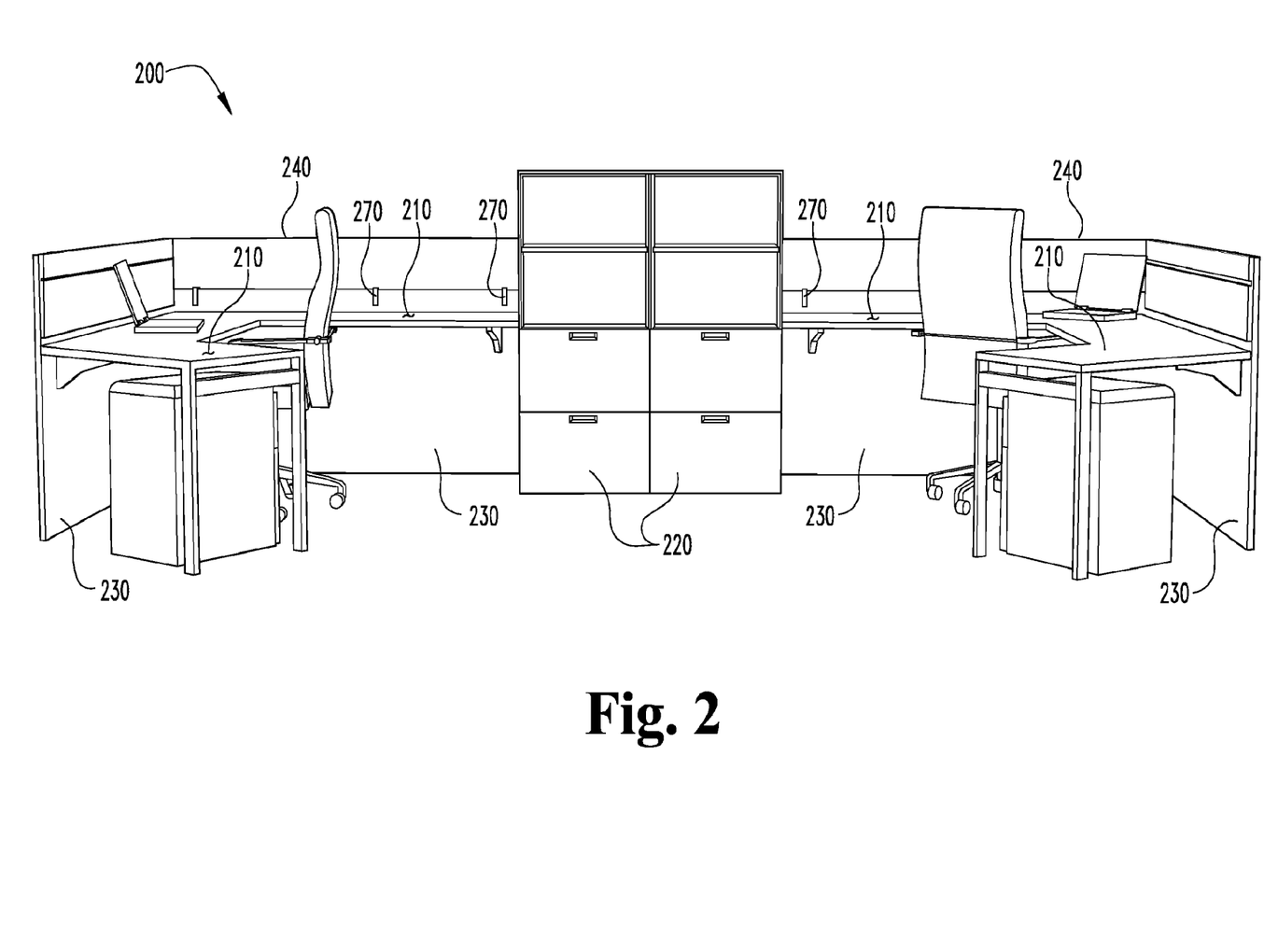
FIG. 2 is a perspective view of another embodiment of a modular office furniture system embodying the technology described herein.

An alternative embodiment is shown as system 200 in FIG. 2. System 200 also includes desk surfaces 210, file drawers 220, vertical panels 230, privacy panels 240, and privacy panel brackets 270. These two particular embodiments define four and two workspaces, respectively, with open space between the workers' areas. Privacy panels 140 and 240 are made of, for example, glass or plastic. The transparency of the privacy panels may be different in different embodiments. For example, in one embodiment, the privacy panels are tinted or smoked so that some light passes through, but some privacy is maintained. Brackets 170 and 270 enable attachment of privacy panels 140 and 240 to vertical panels 130 and 230, respectively, as will be discussed further below.

Figure 3:
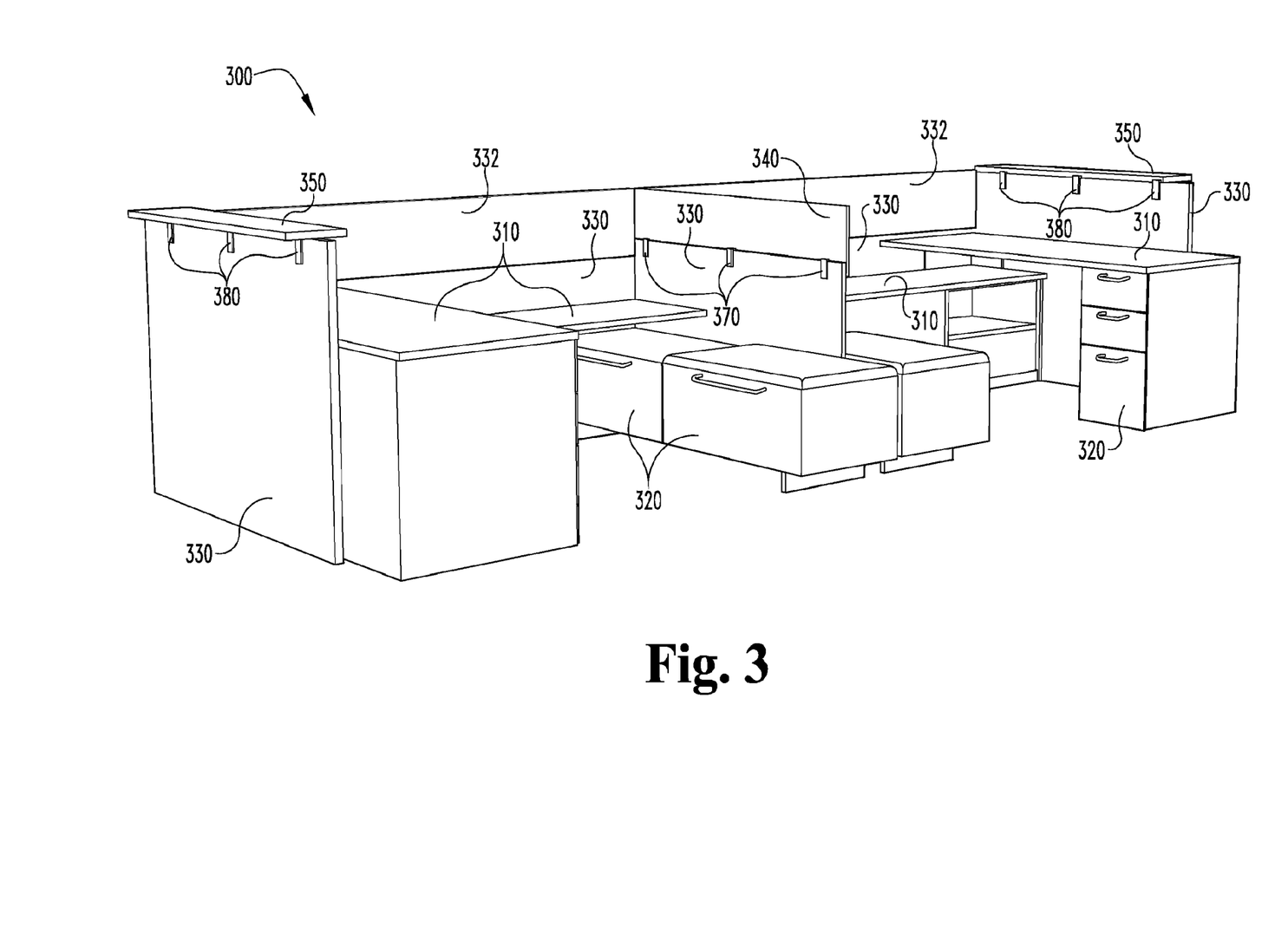
FIG. 3 is a perspective view of still another embodiment of a modular office furniture system embodying the technology described herein.

FIG. 3 illustrates a third exemplary embodiment 300. System 300 includes desk surfaces 310, file drawers 320, vertical panels 330 and 332, privacy panels 340, shelves 350, privacy panel brackets 370, and spine clamps 380. Office workers who use furniture system 300 typically sit in the space between desk surfaces 310 and file drawer 320 on the corresponding side of the system 300. Privacy panels 340 are made of glass or other translucent, and optionally darkened or smoked, material to protect the privacy of the worker. Shelves 350 provide horizontal surfaces on top of vertical panels for temporary storage or transfer of files and documents, and other uses as will be understood by office workers using the furniture. They are held in place by spine brackets 380, alternate embodiments of which are discussed in further detail herein, or as will occur to those skilled in the art. Likewise, privacy panel brackets 370 (alternate embodiments of which are discussed herein, or as will occur to those skilled in the art) removably attach privacy panels 340 to vertical panels 330.

FIGS. 4A-4D illustrate a bracket, for example shelf bracket 400 (also referred to as a spine clamp), which may be used to mount one modular office furniture component to another modular office furniture component according to one embodiment of the present invention. For example, bracket 400 may be used to mount a shelf to the top of a panel, such as a wall panel or other office furniture component incorporating a panel. Bracket 400 includes tabbed member 410 and untabbed member 420. Fastening hardware, for example screws 430, is used to hold members 410 and 420 together. In the depicted embodiment, screws 430 are socket head cap screws that are threaded along the length of their shafts and extend through holes 453 oriented along the extension of support portion 450, though other techniques will be used to attach the pieces together in other embodiments.

Tabbed member 410 includes contact portion 440, support portion 450, and tab 460. Contact portion 440 includes surface 441, which contacts a modular office furniture panel, such as a wall. Support portion 450 includes surface 451, which contacts a modular office furniture panel, such as a shelf. In the illustrated embodiment, surface 451 of support portion 450 is oriented approximately perpendicular (approximately 90 degrees) to surface 441 of contact portion 440.

Figure 4A:
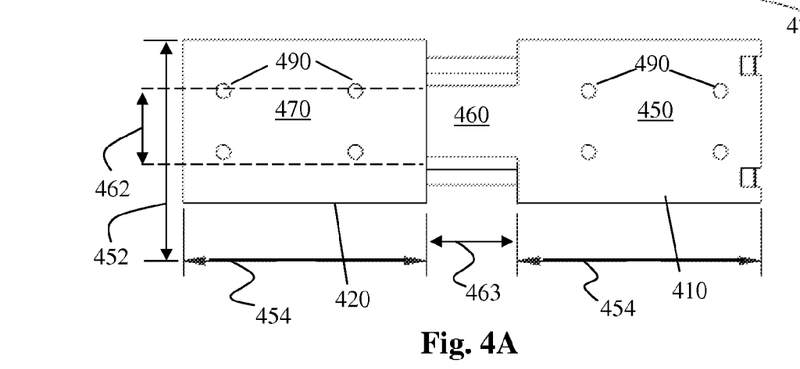
FIG. 4A is a top plan view of a bracket according to one embodiment of the present invention.
Figure 4B:
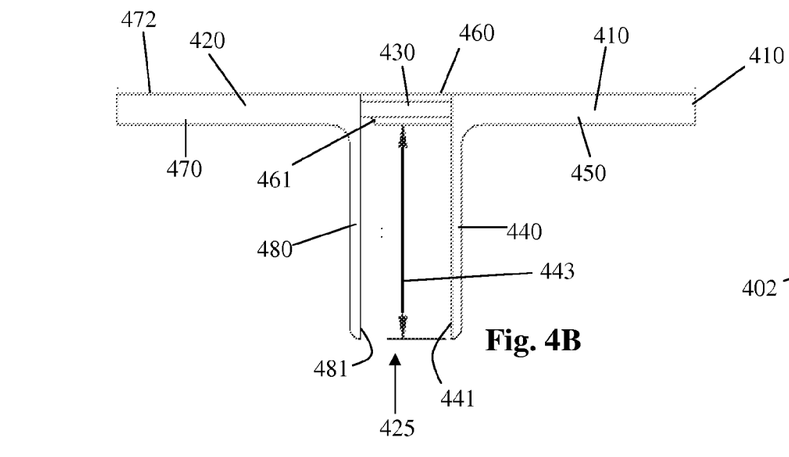
FIG. 4B is a front elevational view of the bracket depicted in FIG. 4A.
Figure 4C:
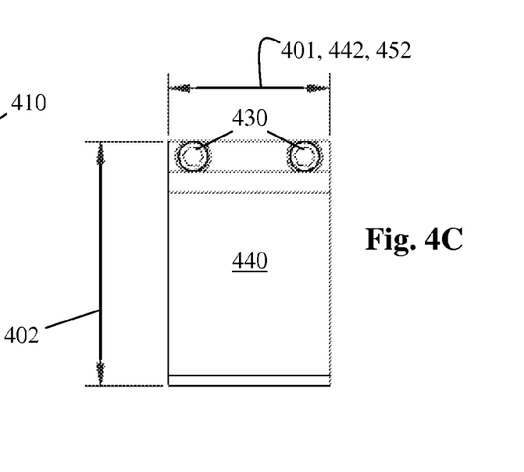
FIG. 4C is a side elevational view of the bracket depicted in FIG. 4A.
Figure 4D:
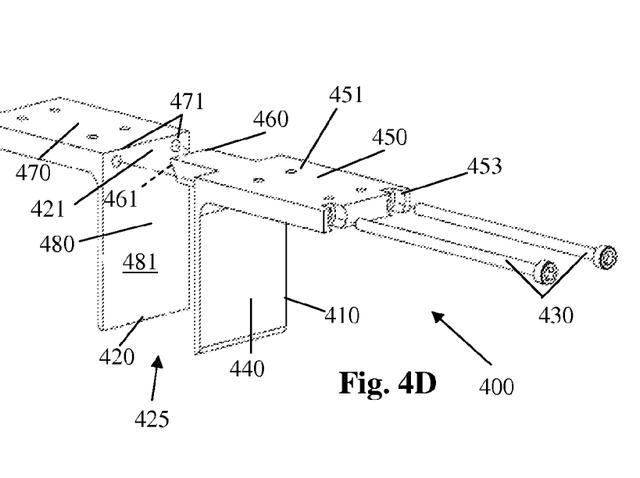
FIG. 4D is an exploded perspective view of the bracket depicted in FIG. 4A.

Tab 460 extends away from the surface 441 of tabbed member 410. In the illustrated embodiment, tab 460 extends approximately perpendicular to surface 441 and approximately parallel to surface 451, which can give tabbed member 410 an overall T-shape appearance (as best seen in FIG. 4B) depending on the relative sizes of tab 460 and support portion 450. As best seen in FIGS. 4A and 4D, the width 462 of tab 460 is less than the width 452 of support portion 450.

When tabbed member 410 is attached to untabbed member 420, tab 460 maintains separation between the two pieces creating a channel 425 between tabbed member 410 and untabbed member 420. Channel 425 receives a piece of modular office furniture, such as a wall panel.

One or more of surfaces 421 and 461 (the surfaces where members 410 and 420 contact one another) are optionally nonparallel to ("angled" with respect to) contact surfaces 441 and/or 481. For example, in one embodiment the end surface 461 of tab 460 is nonparallel to contact surface 441 of member 410 so that when tab 460 meets the opposing face 421 of untabbed member 420, the top of angled end surface 461 meets first, and the force exerted by tab 460 on face 421 is asymmetric about (i.e., not aligned with) the force exerted by the screw 430 on members 410 an 420, resulting in a clamping pressure between contact portions 440 and 480. In other words, the portion of tab 460 oriented above screws 430 experiences a greater pressure than the lower portion of tab 460, and additional clamping pressure between members 410 and 420 is created tending to bring the contact portions 440 and 480 of those pieces together.

Untabbed member 420 includes support portion 470 and contact portion 480. Contact portion 480 includes surface 481, which contacts a modular office furniture panel, such as a wall. Support portion 470 includes surface 472, which contacts a modular office furniture panel, such as a shelf. In the illustrated embodiment, surface 472 of support portion 470 is oriented approximately perpendicular (approximately 90 degrees) to surface 481 of contact portion 480. In the illustrated embodiment, support portion 470 extends approximately perpendicular to contact portion 480, which gives untabbed member 420 an overall L-shaped appearance (as best seen in FIG. 4B where the "L" of member 420 is upside-down). When installed, surface 481 of contact portion 480 meets one side of a panel to which bracket 400 is attached, while surface 441 of vertical portion 440 (of member 410) meets the other side.

To install a shelf bracket 400 according to one embodiment of the present invention, members 410 and 420 of bracket 400 are brought together, and a panel (such as vertical panel 130, 230, or 330) is situated in the channel between surfaces 481 and 441 with the bottom of tab 460 resting on the top of the panel. Either before or after bracket 400 is situated on the panel, screws 430 are inserted through the holes 453 in support portion 450 of member 410 and into receiving holes 471 in support portion 470. After members 410 and 420 are brought together, the bottom surface of another panel (such as shelf 350) that is to be supported by bracket 400 is brought into contact with bracket 400. In one embodiment, the bottom surface of shelf 350 includes recessed portions (not shown) into which bracket 400 is positioned. When the shelf is in place, the shelf is attached to bracket 400, and in particular to support portions 450 and 470, by screws or other fasteners that in this embodiment are inserted from the bottom side of support portions 450 and 470, through holes 490, and into the bottom of the shelf. By this exemplary mechanism, the shelf or organizer supported by bracket 400 is held steady on the top of a vertical panel without requiring screws or other fasteners that would deface the surface of the wall panel. In particular, the shelf is laterally supported and held laterally steady so that a downward force exerted on one end of the shelf, such as someone leaning or placing a large stack of papers on one end of the shelf, does not tip the shelf.

In other embodiments, tab 460 does not have a surface in the same plane as surface 451 of support portion 450. For example, in one embodiment, tab 460 is recessed below ("below" being the downward direction in FIG. 4B) surface 451.

In still other embodiments, both members 410 and 420 of bracket 400 have tabs. For example, in one embodiment member 410 has a tab that extends a portion of the distance that tab 460 extends from surface 441 in FIGS. 4A, 4B and 4D, and member 420 has a tab that extends the remaining portion of the distance that tab 460 extends from surface 441. When the two tabbed members are brought together, the tabs form channel of similar size to the channel depicted in FIGS. 4A, 4B and 4D. The end surfaces of the tabs on each piece are optionally angled to enhance the clamping pressure between members 410 and 420 by bringing the bottoms of those pieces together. In other words, neither, one, or both of the tabs may have an angled contact surface.

In still further embodiments, the width 462 of tab 460 is not less than the width 452 of support portion 450. For example, in one embodiment the width 462 of tab 460 is equal to the width 452 of support portion 450. In this embodiment, the fastening hardware (for example, screws 430) extends through holes in tab 460, which are extensions of the holes in support portion 450 through which the fastening hardware extends.

The dimensions of various components of bracket 400 according to one embodiment of the present invention are included in Table 1.

TABLE 1

Bracket 400 Example Dimensions

| Item | Dimension (inches) |
| --- | --- |
| Bracket width 401 | 2 |
| Bracket height 402 | 3 |

TABLE 1-continued

Bracket 400 Example Dimensions

| Item | Dimension (inches) |
| --- | --- |
| Contact Portion width 442 | 2 |
| Contact Portion length 443 | 2.625 |
| Support Portion width 452 | 2 |
| Support Portion length 454 | 3 |
| Tab length 463 | 1.125 |

FIGS. 5A-5E and 6A-6D illustrate components 510 and 520 that combine to form another bracket, for example another shelf bracket (also referred to as a spine clamp), which may also be used to mount a modular office furniture component to another modular office furniture component according to another embodiment of the present invention. For example, bracket members 510 and 520 may be combined to form a shelf bracket in a manner similar to how bracket members 410 and 420 are combined to form bracket 400. The bracket formed by members 510 and 520 may be used to mount a shelf to the top of a panel, such as a wall panel or other office furniture component incorporating a panel. Fastening hardware similar to that depicted in FIGS. 4A-4D is used to hold members 510 and 520 together. Member 510 includes contact portion 540, support portion 550, and tab 560. Contact portion 540 includes surface 541, which contacts a modular office furniture panel such as a wall. Support portion 550 includes surface 551, which contacts a modular office furniture panel such as a shelf.

Figures 5A, 5B:
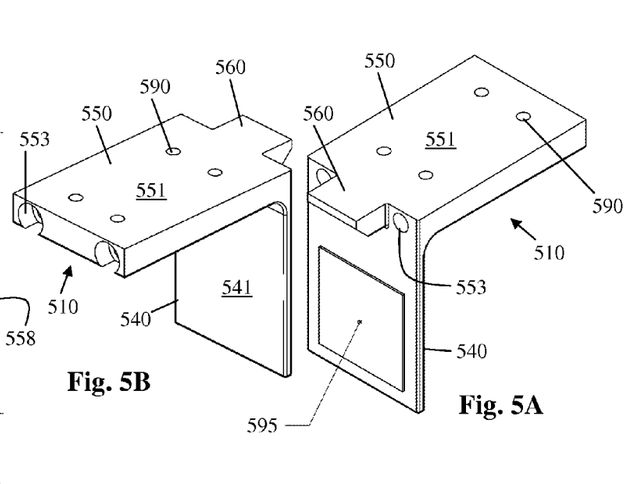
FIG. 5A is a perspective view of a bracket member according to a further embodiment of the present invention.
FIG. 5B is an alternate perspective view of the bracket member depicted in FIG. 5A.
Figure 5C:
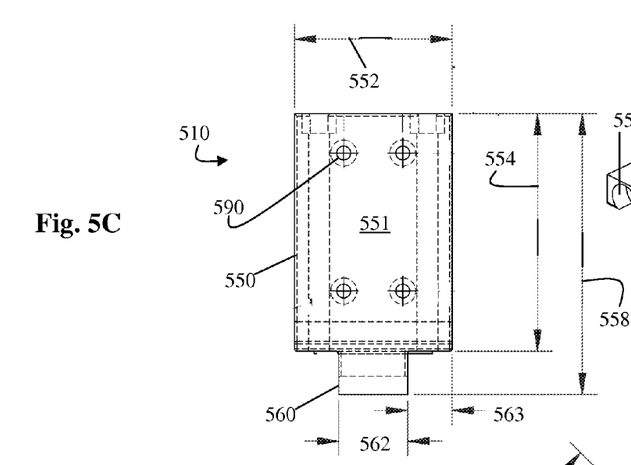
FIG. 5C is a top plan view of one member of the bracket depicted in FIG. 5A.
Figure 5D:
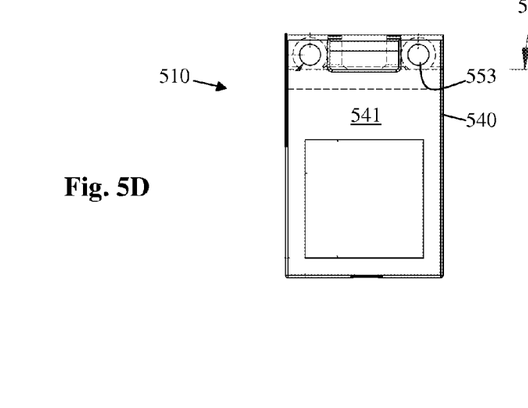
FIG. 5D is a side elevational view of the bracket member depicted in FIG. 5B.
Figure 5E:
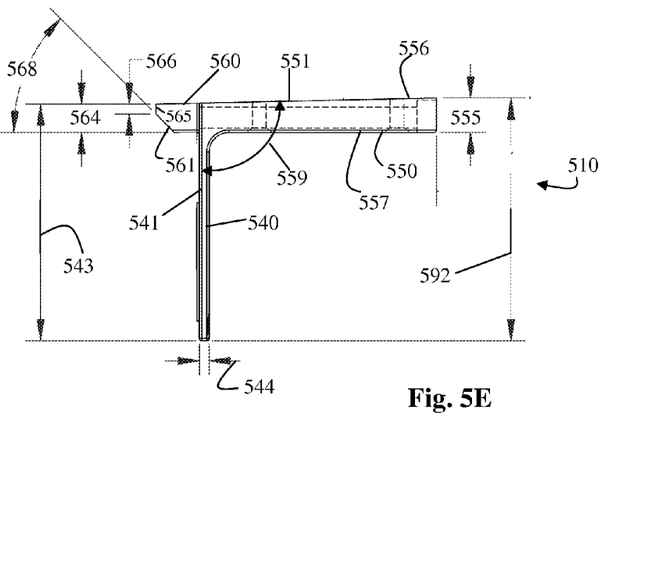
FIG. 5E is a front elevational view of the bracket member depicted in FIG. 5B.

As best seen in FIG. 5E, tab 560 extends away from surface 541 of member 510. In the illustrated embodiment, tab 560 extends approximately perpendicular to surface 541, which can give tabbed member 510 an overall T-shape appearance (as best seen in FIG. 5E) depending on the relative sizes of tab 560 and support portion 550. As best seen in FIG. 5C, the width 562 of tab 560 is less than the width 552 of support portion 550.

Figure 6A:
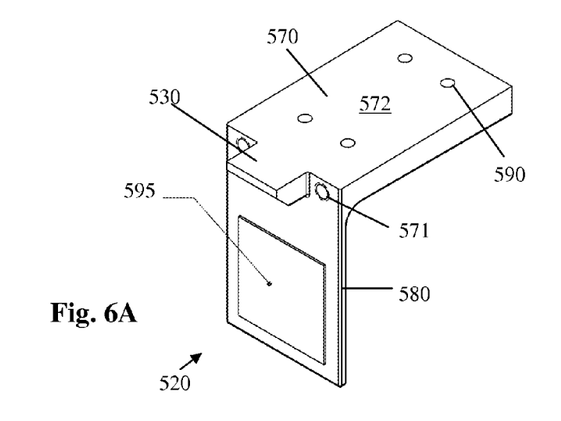
FIG. 6A is a perspective view of another bracket member for use with the bracket member depicted in FIGS. 5A-5E.
Figure 6B:
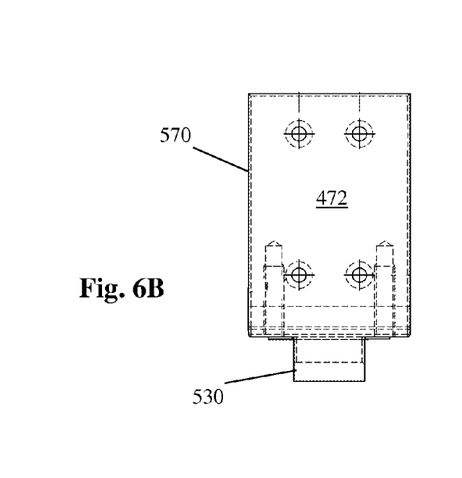
FIG. 6B is a top plan view of the bracket member depicted in FIG. 6A.
Figure 6C:
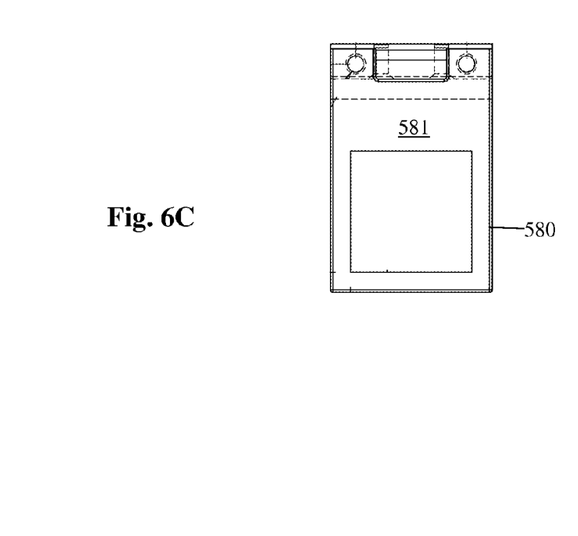
FIG. 6C is a side elevational view of the bracket member depicted in FIG. 6A.
Figure 6D:
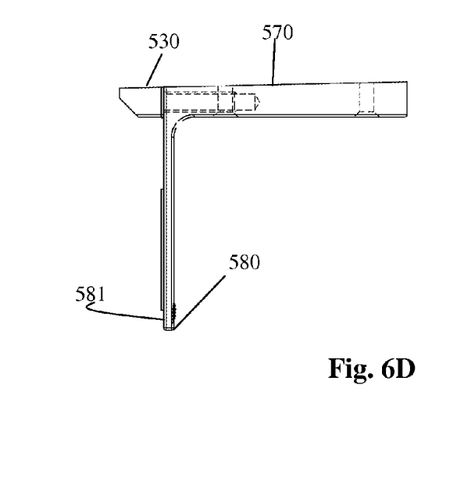
FIG. 6D is a front elevational view of the bracket member depicted in FIG. 6A.

When member 510 is attached to member 520, tabs 560 and 530 maintain separation between the two pieces creating a channel between contact portion 540 of member 510 and contact portion 580 of member 520 similar to channel 425 in FIG. 4B. This channel between contact portions 540 and 580 receives a piece of modular office furniture, such as a wall panel.

Tab 560 is tapered with the thickness 564 of the shank of tab 560 being thicker than the thickness 566 of the contact surface 565 at the distal end. Contact surface 565 is approximately parallel to surface 541 of contact portion 540. Tab 560 includes a cut-out portion with an angled surface 561 to form the thinner distal end. In the illustrated embodiment, surface 561 is oriented at an angle 568 with respect to the lower surface of tab 560, and the lower surface of tab 560 is approximately perpendicular to surface 541 of contact portion 540. The thickness 566 of tip 565 is approximately one-third the thickness 564 of the shank of tab 560 in the illustrated embodiment. This tapering of tab 560 and the asymmetric location of the contact surface 565 (asymmetric in the vertical direction as depicted in FIG. 5E) in relation to the force exerted by the mounting hardware enhances the clamping pressure between members 510 and 520 while maintaining the strength of tab 560, and in particular maintaining the strength of tab 560 to resist the compressive forces exerted by the attachment hardware when members 510 and 520 are connected to one another.

The thickness of support portion 550 is not constant in this embodiment, increasing as support portion 550 extends away from tab 560. See FIG. 5E. In the illustrated embodiment, the thickness of support portion 550 adjacent tab 560 is approximately equal to the thickness 564 of the shank of tab 560 while the thickness 555 of the distal end 556 of support portion 550 is thicker than the thickness 564 of tab 560's shank. The upper surface 551 and lower surface 557 of support portion 550 are optionally planar (as depicted in FIGS. 5A-5E). The angle between surface 441 of contact portion 440 and surface 551 of support portion 550 is depicted as angle 559, and the increase in the thickness of support portion 550 results in angle 559 being greater than 90 degrees. This arrangement enhances the pressure exerted by contact portion 540 on the office furniture component (such as a wall panel) to which the bracket formed by members 510 and 520 is attached.

Member 520 is similar to member 510. Optionally, as depicted in FIGS. 6A-6D, member 520 has hardware receiving holes 571 that are different from hardware receiving holes 553 in member 510. For example, in one embodiment, holes 571 are threaded to engage threaded bolts. In still other embodiments, members 510 and 520 are identical.

Member 520 includes support portion 570, contact portion 580 and tab 530. Contact portion 580 includes surface 581, which contacts a modular office furniture panel, such as a wall. Support portion 570 includes surface 572, which contacts a modular office furniture panel, such as a shelf. The thickness of support portion 570 increases as support portion 570 extends away from contact portion 580. Tab 530 extends approximately perpendicular to surface 581 of contact portion 580 and, similar to tab 560, optionally includes an angled surface that forms a contact surface at the distal end of tab 530 that is thinner than the shank of tab 530. When installed, surface 581 of contact portion 580 meets one side of the panel to which the bracket formed by members 510 and 520 is attached, while surface 541 of vertical portion 540 (of member 510) meets the other side.

As illustrated in FIGS. 5A-5E and 6A-6D, members 510 and 520 optionally include pads 595, which can enhance the connection between bracket 550 and the panel to which the bracket formed by members 510 and 520 is attached and/or help protect the panel to which the bracket is attached from scraping or marring. In alternate embodiments, pads 595 are sized differently from those depicted in the figures and may be positioned at various locations on the surface of the bracket formed by members 510 and 520. Still further, various surfaces of the bracket formed by members 510 and 520 may be polished to enhance their appearance and/or minimize potential damage to the panels to which the bracket formed by members 510 and 520 is attached.

To install a shelf with the bracket formed by members 510 and 520 according to one embodiment of the present invention, members 510 and 520 are brought together, and a panel (such as vertical panel 130, 230, or 330) is situated in the channel between surfaces 581 and 541 with the bottoms of tabs 560 and 530 resting on the top of the panel. Either before or after the bracket formed by members 510 and 520 is situated on the panel, fastening hardware is inserted through the holes 553 in support portion 550 of member 510 and into receiving holes 571 in support portion 570. After members 510 and 520 are brought together, the bottom surface of another panel (such as shelf 350) that is to be supported by the bracket is brought into contact with the bracket. In one embodiment, the bottom surface of shelf 350 includes recessed portions (not shown) into which the bracket formed by members 510 and 520 is positioned. When the shelf is in place, the shelf is attached to the bracket, and in particular to support portions 550 and 570, by screws or other fasteners that in this embodiment are inserted from the bottom side of support portions 550 and 570, through holes 590, and into the bottom of the shelf. By this exemplary mechanism, the shelf or organizer supported by the bracket formed by members 510 and 520 is held steady on the top of a vertical panel without requiring screws or other fasteners that would deface the surface of the wall panel. In particular, the shelf is laterally supported and held laterally steady so that a downward force exerted on one end of the shelf, such as someone leaning or placing a large stack of papers on one end of the shelf, does not tip the shelf.

In other embodiments, tabs 530 and 560 are not in the same planes as surfaces 551 and 572, respectively. For example, in one embodiment the upper surfaces of tabs 530 and 560 are recessed below ("below" being the downward direction in FIGS. 5E and 6D) surfaces 551 and 572, respectively.

In still other embodiments, the width 562 of tab 560 is not less than the width 552 of support portion 550. For example, in one embodiment the width 562 of tab 560 is equal to the width 552 of support portion 550. In this embodiment, the fastening hardware (for example, screws 530) extends through holes in tab 560, which are extensions of the holes in support portion 550 through which the fastening hardware extends.

The dimensions of bracket member 510 according to one embodiment of the present invention are included in Table 2. Although the dimensions listed in Table 2 are in reference to bracket member 510, these example dimensions also represent the dimensions of bracket member 520 in one example embodiment.

TABLE 2

Bracket Member 510 Example Dimensions

| Item | Dimension (inches) |
| --- | --- |
| Length 543 | 3 |
| Thickness 544 | 0.125 |
| Width 552 | 2 |
| Length 554 | 3.0125 |
| Thickness of distal end 555 | 0.4375 |
| Length 558 | 3.5625 |
| Angle 559 | 91.256 degrees |
| Width 562 | 0.875 |
| Offset 563 | 0.5625 |
| Thickness 564 | 0.359375 |
| Tip thickness 566 | 0.125 |
| Angle 568 | 45 degrees |
| Distance 592 | 3.078125 |

FIGS. 7A-7D illustrate a bracket, for example a privacy panel bracket 600, which may be used to mount one modular office furniture component to the end of another furniture component according to another embodiment of the present invention. For example, bracket 600 may be used to mount a privacy panel to the top of a second panel, such as a wall panel. In this illustrated embodiment, bracket 600 includes U-shaped member 610 and L-shaped member 620.

U-shaped member 610 includes a base member 616, two side members 617 and 618, and an interior surface 612 that define a channel 650, which receives a modular office furniture component, such as a wall panel. Member 610 is optionally sized to snugly receive the office furniture component to enhance the ability of bracket 600 to securely hold two office furniture components together, although the degree of snugness may vary depending on the particular requirements of each embodiment.

Side member 618 includes a face 611, which contacts L-shaped member 620, and an exterior surface 614, which contacts a second office furniture component, such as a privacy panel. Face 611 is optionally angled so that when members 610 and 620 are connected, the angled surface will tend to bring the unsecured distal end 626 of L-shaped member 620 toward U-shaped member 610 to provide additional clamping pressure between members 610 and 620. Side member 618 also includes a mounting portion, for example holes 615, which facilitate a secure connection between L-shaped member 620 and U-shaped member 610.

One side of U-shaped member 610 is optionally shorter than the other side of U-shaped member 610. For example, the side of U-shaped member 610 with side face 670 is shorter (which is, for example, 2.625 inches long) than the side of U-shaped member 610 with connection face 611 (which is, for example, 3 inches long). Stated differently, the distal end of side member 617 is nearer to base 616 than the distal end of side member 618. This difference in length between the two sides of U-shaped member 610 simplifies the connecting and disconnecting of U-shaped member 610 and L-shaped member 620 by providing space for tools (such as a screwdriver) to access and manipulate the fastening hardware (such as screws 630).

Figures 7A, 7B, 7C, 7D:
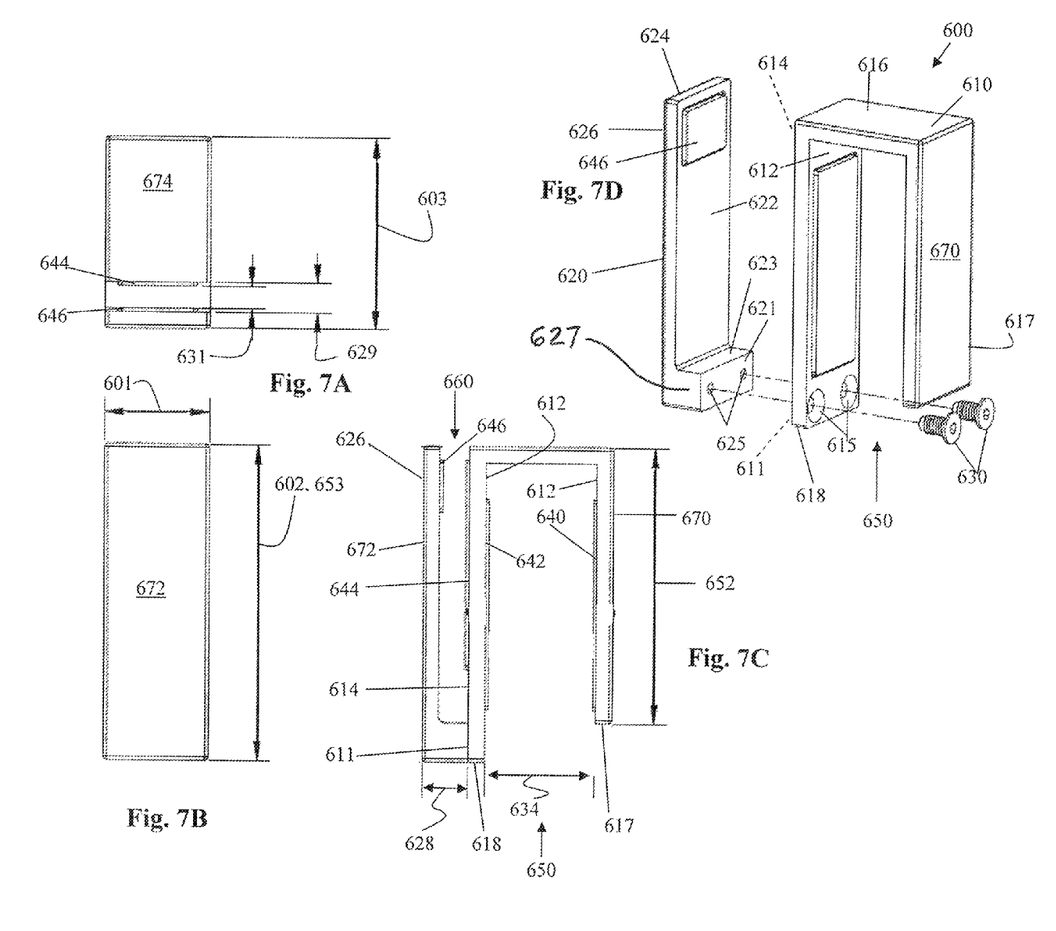
FIG. 7A is a top plan view of a bracket according to another embodiment of the present invention.
FIG. 7B is a side elevational view of the bracket depicted in FIG. 7A.
FIG. 7C is a front elevational view of the bracket depicted in FIG. 7A.
FIG. 7D is an exploded perspective view of the bracket depicted in FIG. 7A.

L-shaped member 620 includes a base member 627 and a side member 624. Surfaces 622 and 623 of L-shaped member 620 contact the second office furniture component. A mounting portion, for example receiving holes 625 of L-shaped member 620, facilitate a secure connection with U-shaped member 610. L-shaped member 620 further includes a face 621, which contacts face 611 of U-shaped member 610. When members 610 and 620 are connected, a second channel 660 is formed between members 610 and 620. As best seen in FIG. 7C, channel 660 opens in a direction that channel 650 does not open, channel 650 opens in a direction that channel 660 does not open, and these two directions are opposite.

Face 621 of L-shaped member 620 is optionally angled so that when members 610 and 620 are connected, the angled surface will tend to bring the unsecured end of L-shaped member 620 toward U-shaped member 610 to provide additional clamping pressure between members 610 and 620. In alternate embodiments, L-shaped member 620 includes a cut-out portion with an angled surface similar to angled surface 561 of tab 560 (see FIG. 5E) to provide additional clamping pressure between members 610 and 620.

Fastening hardware, for example screws 630, are used to hold members 610 and 620 together, although other techniques will be used to attach the pieces together in other embodiments. In the depicted embodiment, the screws 630 pass through holes 615 in U-shaped member 610 and into receiving holes 625 in L-shaped member 620 to hold face 621 of member 620 and face 611 of member 610 together. In the depicted embodiment, holes 615 are countersunk to enhance the ability of bracket 600 to hold two components of modular office furniture together without damaging or marring either component.

Thin pads are optionally attached to the surfaces of bracket 600 that will come into contact with other components of the furniture system. For example, pads 640 and 642 are situated on the interior surface 612 of U-shaped member 610, while pad 644 is situated on the exterior surface 614 of U-shaped member 610 as illustrated. Opposite pad 644 is pad 646, which is situated near the free end of L-shaped member 620. When bracket 600 is assembled, channel 650 receives an end of a first modular office furniture component, such as the top of a vertical panel (e.g., vertical panels 130, 230, or 330), while channel 660 receives an end of a second modular office furniture component, such as the bottom of a privacy panel (e.g., privacy panels 140, 240, or 340 shown in FIGS. 1, 2, and 3, respectively).

One or more surfaces of bracket 600 are optionally polished to enhance their appearance.

The dimensions of various components of bracket 600 according to one embodiment of the present invention are included in Table 3.

TABLE 3

Bracket 600 Example Dimensions

| Item | Dimension (inches) |
| --- | --- |
| Bracket width 601 | 1 |
| Bracket height 602 | 3 |
| Bracket width 603 | 1.8125 |
| L-shaped Member Base length 628 | 0.4375 |
| Channel width 629 without pads (measured adjacent Surface 623) | 0.28125 |
| Channel width 631 with pads (measured adjacent Surface 623) | 0.21875 |
| Separation 634 (between sides of U-shaped member) | 1 |
| U-shaped member side length 652 | 2.625 |
| U-shaped member side length 653 | 3 |

When used to install, for example, a privacy panel atop a wall panel according to one embodiment of the present invention, U-shaped member 610 and L-shaped member 620 are attached using the fastening hardware, such as screws 630, but the fastening hardware is not fully tightened. The privacy panel is positioned in channel 660, and bracket 600 is located where desired along the bottom edge of the privacy panel so that the bottom edge of the privacy panel rests on surface 623 of L-shaped member 620. Screws 630 are tightened to pinch the panel in the bracket 600 so that their relative positions are maintained by friction between the privacy panel and pads 644 and 646. The privacy panel and the attached privacy panel brackets 600 are attached to the top of the vertical panels by placing the top of the vertical panels in channel 650 of each of the brackets 600. Once the vertical panels are inserted into channel 650, the fastening hardware is hidden from view, presenting a clean and professional appearance. The order in which these acts are performed may be varied when attaching two components of office furniture using one or more brackets 600 as would be understood by one of ordinary skill in the art.

Using this attachment mechanism, one piece of office furniture (such as a privacy panel) can be attached at or near the end of another piece of office furniture (such as at or near the top of a vertical panel) without damaging or leaving permanent marks on either component. In some embodiments, no frame is required around the privacy panel, which provides a more flexible system and is easier to repair than many existing office furniture systems. Additionally, when bracket 600 is in place, only side faces 670 and 672, and top surface 674 of the bracket 600 are visible, without screw heads or other attachment mechanisms being apparent.

Other specific structures, materials, attachment mechanisms, and component structures will occur to those skilled in the art in view of the present disclosure.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Dimensions, whether used explicitly or implicitly, are not intended to be limiting and may be altered as would be understood by one of ordinary skill in the art. Exemplary embodiments have been shown and described, and all changes and modifications that come within the spirit of the invention are desired to be protected.

What is claimed is:

1. A modular furniture system, comprising:
   a first bracket member with a first contact surface;
   a second bracket member with a second contact surface and a tab extending approximately perpendicular to the second contact surface, one end of the tab having an end surface in contact with the first bracket member; and
   a connector attached to the first and second bracket members, the connector exerting a force holding the end surface of the tab in contact with the first bracket member, the tab spacing the first and second contact surfaces apart and forming a channel between the first and second contact surfaces, the end surface of the tab being asymmetrically located in relation to the connector force and forming a clamping force between the first and second contact surfaces; and
   wherein the first and second bracket members include shelf support portions extending outwardly from the channel.

2. The system of claim 1, the end surface of the tab being nonparallel and nonperpendicular to the second contact surface.

3. The system of claim 1, wherein the shelf support portions are connected to and laterally support a shelf and the first and second bracket members are mounted to a top of a panel received within the channel.

4. The system of claim 3, the shelf support portion of the first bracket member including a surface in contact with the shelf, the shelf support portion surface of the first bracket member being oriented to create a clamping force on the panel; and the shelf support portion of the second bracket member including a surface in contact with the shelf, the shelf support portion surface of the second bracket member being oriented to create a clamping force on the panel.

5. The system of claim 3, further comprising:
   a plurality of connectors;
   a plurality of brackets, each bracket including at least one connector attached to a first and second bracket member;
   a plurality of panels; and
   a plurality of shelves, each bracket receiving one of the plurality of panels in the channel and being connected to the one of the plurality of panels, each bracket also being connected to one of the plurality of shelves.

6. The system of claim 1, the first bracket member being L-shaped and the second bracket member being T-shaped.

7. The system of claim 1, the first bracket member including a tab extending approximately perpendicular to the first contact surface, one end of the first bracket member tab having an end surface in contact with the end surface of the second bracket member tab.

8. The system of claim 7, the first bracket member and second bracket member both being T-shaped.

9. A method, comprising:
   connecting first and second bracket members together, the first bracket member including a tab with an end surface and the second bracket member including a tab with an end surface, said connecting including
   spacing portions of the first and second bracket members, wherein said spacing includes abuttingly engaging the two end surfaces with one another and spacing portions of the first and second bracket members apart with the two tabs;
   forming a channel between the first and second bracket members with the two tabs;
   receiving a panel within the channel;
   exerting a force on the first and second bracket members with fastening hardware, the force being asymmetric in relation to the end surfaces and resulting in the first and second bracket members exerting a clamping force on the panel;
   attaching a shelf to the two bracket members after said connecting, the first and second bracket members each including a shelf support portion extending outwardly from the channel; and
   holding the shelf laterally steady with the first and second bracket members.

10. The method of claim 9, the first bracket member and second bracket member both being T-shaped.

11. A method, comprising:
    connecting first and second bracket members together, wherein the second bracket member includes a tab, the tab having an end surface, said connecting including
    spacing portions of the first and second bracket members, wherein said spacing includes abuttingly engaging the end surface with the first bracket member and spacing portions of the first and second bracket members apart with the tab;
    forming a channel between the first and second bracket members with the tab;
    receiving a panel within the channel;
    exerting a force on the first and second bracket members with fastening hardware, the force being asymmetric in relation to the end surface and resulting in the first and second bracket members exerting a clamping force on the panel;
    attaching a shelf to the two bracket members after said connecting, the first and second bracket members each including a shelf support portion extending outwardly from the channel; and
    holding the shelf laterally steady with the first and second bracket members.

12. The method of claim 11, the first bracket member being L-shaped and the second bracket member being T-shaped.

* * * * *